Feb. 12, 1946.　　　A. F. HICKMAN　　　2,394,547
SPRING SUSPENSION FOR RAILROAD CARS
Filed Jan. 28, 1943　　　3 Sheets-Sheet 1

INVENTOR
Albert F. Hickman
BY
Popps and Popps
ATTORNEYS

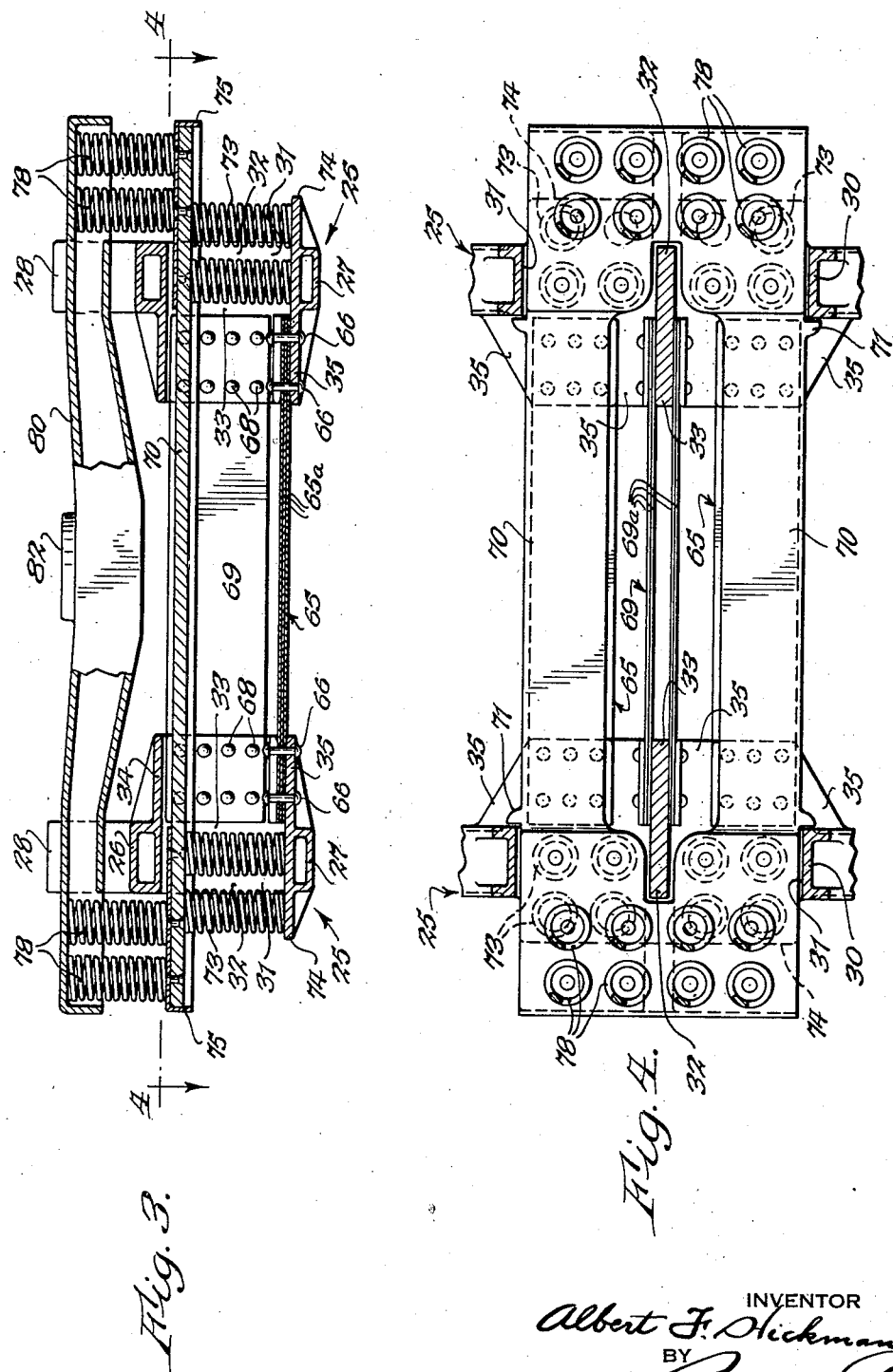

Feb. 12, 1946.  A. F. HICKMAN  2,394,547
SPRING SUSPENSION FOR RAILROAD CARS
Filed Jan. 28, 1943   3 Sheets-Sheet 3
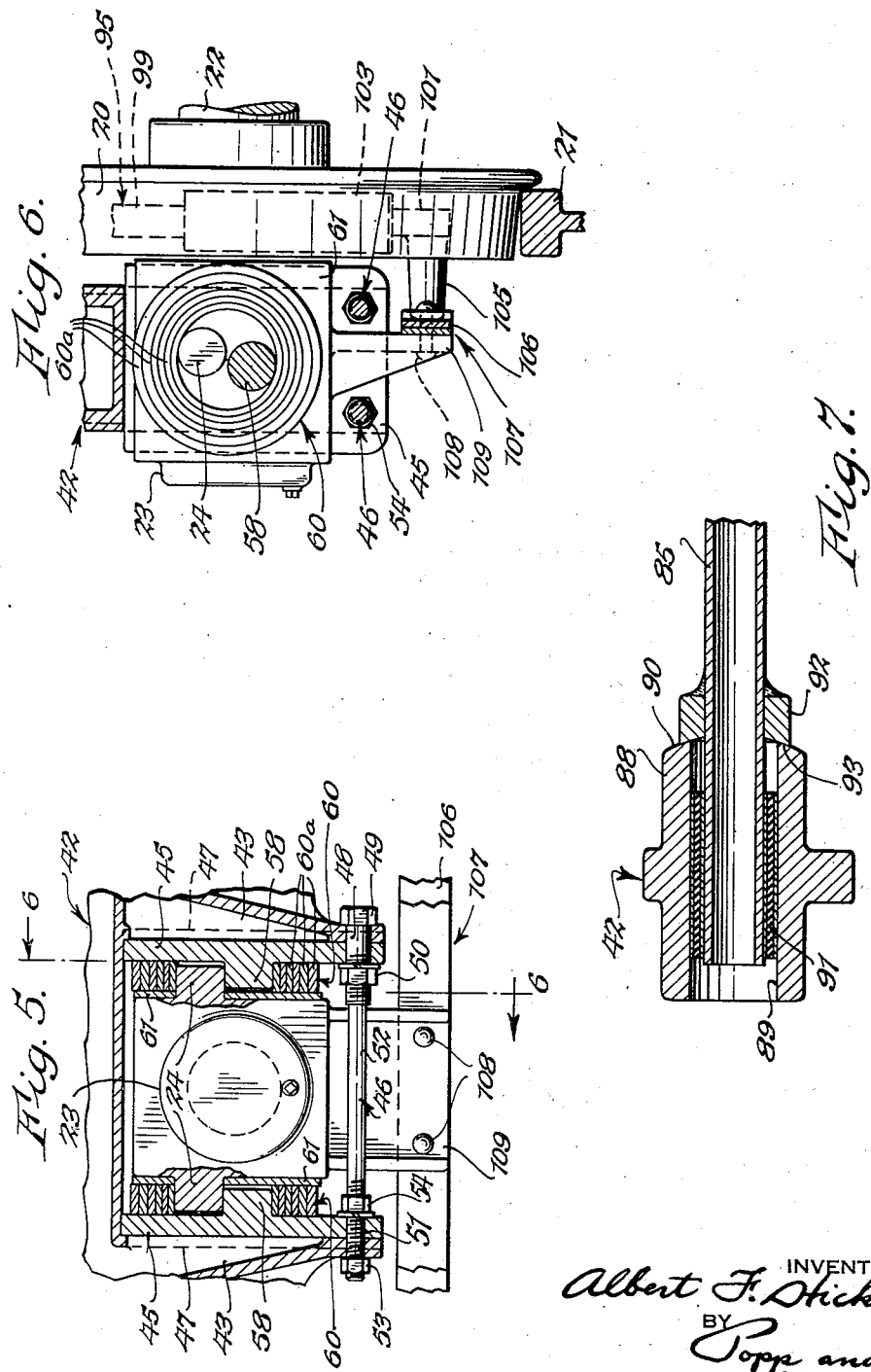
INVENTOR
Albert F. Hickman
BY
Popp and Popp
ATTORNEYS Patented Feb. 12, 1946

2,394,547

UNITED STATES PATENT OFFICE 2,394,547

SPRING SUSPENSION FOR RAILROAD CARS

Albert F. Hickman, Eden, N. Y., assignor to Hickman Pneumatic Seat Co. Inc., Eden, N. Y., a corporation of New York Application January 28, 1943, Serial No. 473,824

3 Claims. (Cl. 105—197)

This invention relates to a spring suspension for railroad cars and is more particularly shown as embodied in the truck of a passenger car, although features of the invention are equally applicable to freight cars. This application is a companion application of my copending applications Serial Nos. 473,348, 476,943 and 501,175, filed January 23, 1943, February 24, 1943, and September 3, 1943, respectively.

One of the principal objects of the invention is to provide a spring suspension which will function to safely support the car body at high speeds, higher speeds being particularly demanded of passenger trains.

Another object of the invention is to employ conventional railroad truck construction, particularly in the use of journal boxes, truck side frames, bolsters, planks and helical bolster springs as now are employed in conventional railroad truck constructions.

Another object is to provide a railroad truck having such a spring suspension in which all parts are well within the limits of size and movement required by present railroad standards.

Another object of the invention is to provide such a spring suspension which has the necessary features of safety both against breakage and also to insure the car being solidly supported on the tracks at all rail speeds.

Another object is to provide such a spring suspension which provides the necessary stability and also provides the desired riding qualities. It is a particular object to secure such stability by wide effective spring centers.

Another object is to provide a truck and spring suspension for railroad cars which is light in weight and is also adapted to be used in conjunction with lightweight bodies and equipment, such lightweight bodies and equipment being desirable with the use of increased rail speeds.

Another object of the invention is to provide such a suspension which will support the car body in such manner as to permit a minimum side sway even with the high centers of gravity of conventional railroad bodies.

Another object of the invention is to provide such a spring suspension having many operating economies, such as the saving in fuel; the saving in wear on the tracks and the wheels; and the saving in maintenance of the car bodies, trucks and spring suspensions.

Another object is to obtain the widest effective spring centers and still keep within the clearance limits imposed upon railroad truck design, this being obtained by the use of a double bolster construction.

Another object is to provide such a double bolster construction in which any desired frequency or degree of spring deflection can be obtained.

Other advantages and objects of the invention will be readily apparent from the following description and the accompanying drawings, weherein:

Fig. 3 is a vertical transverse section, taken on line 3—3, Fig. 2.

Fig. 4 is a fragmentary horizontal section, taken on line 4—4, Fig. 3.

Fig. 5 is an enlarged fragmentary view similar to Fig. 2 and showing a part of the pedestal legs of the truck frame and the journal box in section.

Fig. 6 is a fragmentary vertical transverse section, taken on line 6—6, Fig. 5.

Fig. 7 is an enlarged fragmentary transverse section, taken on line 7—7, Fig. 1.

Figure 1:
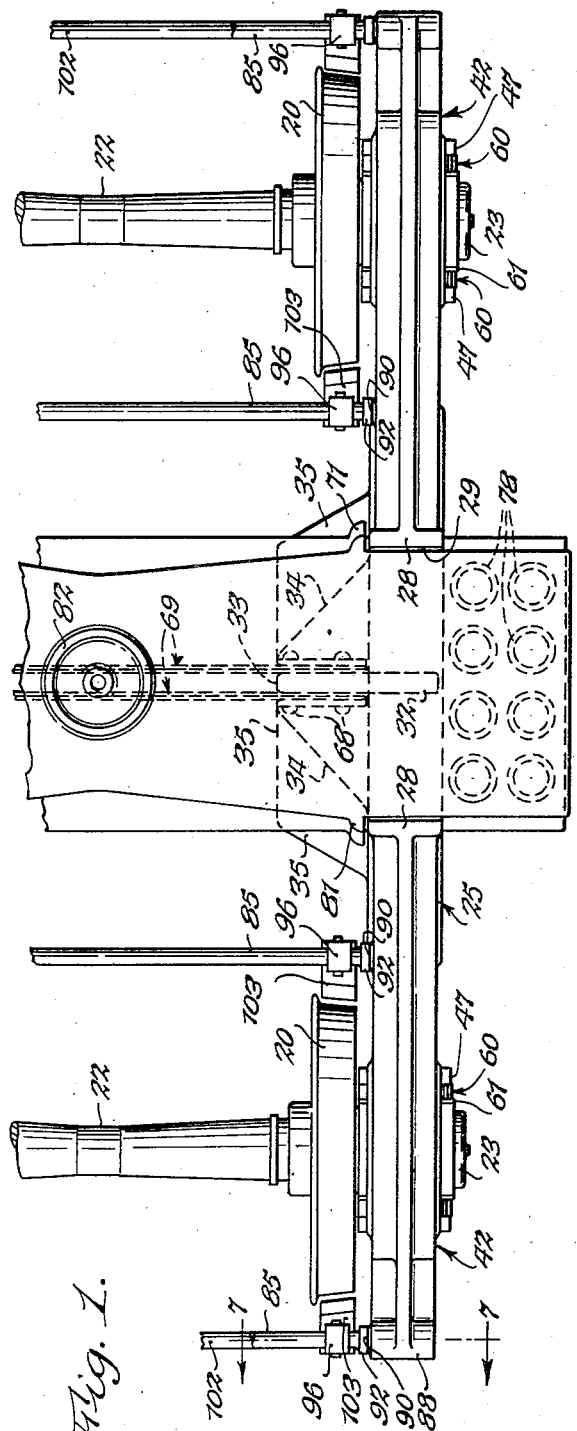
Fig. 1 is a fragmentary top plan view of a truck for a railroad car body embodying my invention.

The invention is shown as embodied in a four wheel truck particularly designed for passenger car service, although it will be understood that features of the invention can be employed in conjunction with six wheel trucks and can be employed in trucks designed for freight car service, particularly the means shown whereby lateral cushioning of the truck frame is achieved through the use of ring springs between the journal boxes for the axles and the pedestal legs of the truck side frames. The flanged railroad wheels 20 are shown as riding upon the rails 21 of the track and as being fast to axles 22 of standard construction. The ends of the axles project beyond the wheels 20 and are journalled in journal boxes 23 of any usual and well known construction, pivot lugs or bosses 24 projecting horizontally forward and rearward from the front and rear walls, respectively, of the journal boxes and which connect, through ring springs as hereinafter described, with the pedestal legs of the truck side frames to provide lateral and vertical cushioning. These truck side frames, indicated generally at 25, are shown as made of a single steel casting, although it will be understood that they could be of fabricated construction, and each is formed to provide an upper bar 26, a lower bar 27, a pair of upper bolster guide columns 28 which form a top bolster opening 29 and a pair of lower bolster guide columns 30 which form a lower bolster opening 31, the upper bar 26 of the truck side frame being arranged between these bolster openings 29 and 31.

In addition a vertical column 32 is arranged at the center of the lower bolster opening 31, this column being formed integrally with the upper and lower bars 26 and 27 of the truck side frame and having an inwardly projecting portion 33 which forms an attaching flange for a series of laminated cross plates as hereinafter described. This flange or inwardly projecting portion 33 of the column 32 can be reinforced at its upper end by a triangular web 34 formed integrally with the top bar 26 of the truck side frame and similarly can be reinforced at its lower end by a horizontal web 35 formed integrally with the lower bar 27 of the truck side frame.

Figure 2:
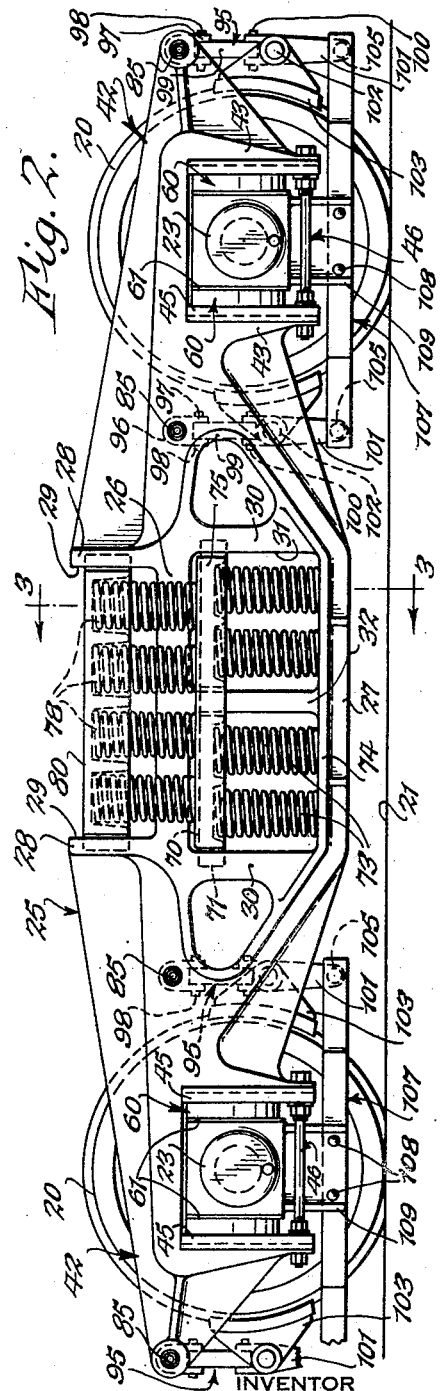
Fig. 2 is a side elevation thereof.

Each of the truck side frames 25 is formed at its ends to provide a pedestal 42 having a pair of pedestal legs 43 which form a pedestal jaw in which the corresponding journal box 23 is arranged. As best shown in Figs. 2, 5 and 6, a plate 45 is secured by a pair of tie bolts 46 to the inner face of each of the pedestal legs 43, these plates being held against lateral displacement by side flanges 47 which embrace the pedestal legs and the tie bolts 46 preventing these plates from sliding downwardly but permitting them to be removed.

To permit such downward removal of the side plates 45, and hence the entire axle, journal box and wheel assembly from the truck frame, the tie bolts 46 are of special construction to permit for ready endwise removal. For this purpose, as best shown in Fig. 5, each tie bolt 46 has an enlarged portion 48 at the end thereof which is provided with a head 49. This enlarged end of the tie bolt is threaded to receive a nut 50, and extends through holes provided in one of the pedestal legs 43 and its plate 45. The reduced end 51 of each tie bolt is likewise threaded and extends through holes provided in the opposite pedestal leg 43 and plate 45. A pair of nuts 53 and 54 are arranged on the reduced extremity of each tie rod and bear against opposite sides of the adjacent pedestal leg 43 and its plate 45. In removing the tie bolt 46, the nut 50 is backed off the threads on the enlarged part 48 of the tie rod and is slidable on the reduced part 52 thereof. The outer nut 53 is then removed and the tie rod can then be moved endwise to the right, as viewed in Fig. 5, to disengage its reduced threaded end 52 from the corresponding pedestal leg 43 and its side plate 45. Following this the nuts 54 and 50 can be completely removed from the tie rod, this permitting the tie rod to be completely removed endwise from the truck.

The plates 45 are formed to provide opposed pivot bosses or lugs 58 which are preferably about the same size as the pivots 24 on the journal boxes and are arranged under and immediately adjacent thereto. As best shown in Fig. 6, in the normal loaded condition of the passenger car, the axis of the pedestal pivots 58 is arranged in a vertical plane disposed outside of the vertical plane intersecting the axis of the corresponding journal box pivots 24. By this arrangement the line or plane of pressure between these pivots extends upwardly and inwardly from the pedestal pivots 58 to the axle or journal box pivots 24.

For this purpose each companion pair of these pedestal and axle or journal box pivots 58 and 24 is connected by a shackle or ring spring assembly 60 composed of a plurality of nested endless springs 60a. Each of these groups 60 of springs is essentially a shackle connecting each axle or journal box pivot 24 with the corresponding pedestal pivot 58 and extending upwardly and inwardly from the pedestal pivot 58 to the axle pivot 24. However, while slanting rigid shackles having full bearing with these pivots could be provided, it is highly desirable that they be in the form of springs to act as cushions against both vertical and lateral impacts between each axle and the truck frame and thereby reduce the unsprung weight of the car to the wheels, axles and journal boxes as well as to provide a yielding resistance to sledge hammer blows or violent impacts directly at the axle and eliminating the transmission of such violent impacts through the truck frame to the bolster springs. Further, for reasons of economy, it is desirable that these shackles be in the form of cylindrical bodies of spring steel which can be readily produced by cutting sections from spring steel tubing of progressively smaller diameter, heat treating the cut sections, and nesting the sections together. These sections are cut to fit the space between each plate 45 and a wear plate 61 which is fitted over the corresponding axle or journal box pivot 24 and against the face of the journal box so as to provide a readily replaceable wear unit against which the ends of the ring springs 60 oscillate. The plates 45 against which the opposite ends of the ring springs oscillate are also, of course, readily replaceable should wear take place to an extent which would permit an excessive movement of the axles and their journal boxes lengthwise of the car body.

Such nested ring springs serve the requirements of supporting loads of practically any size on pivots, such as the pivots 24 and 58, which move relative to each other without rotation about their axes. This type of ring spring shackle accommodates variable loads and horizontal as well as vertical movements of the pivots and since the contact between the two pivots and the ring springs is inherently a rolling contact, there is no need for lubrication, this being an important feature of the invention. The desired amount of vertical deflection of the ring springs 60 is determined by the number of rings, the circumferential size of the rings and the thickness of the rings.

Referring more particularly to Figs. 3 and 4, it will be noted that the horizontal webs 35 which strengthen the vertical flange or inward projection 33 of the column 32 form broad shelves to which are secured the opposite ends of a pair of planks indicated generally at 65. These planks are arranged on opposite sides of the flange 33 and each is composed of a plurality of sheet metal laminations 65a which are arranged horizontally one on top of the other. Each end of each plank is secured to the upper face of the corresponding web or shelf 35 by a plurality of spaced rivets 66 which hold the end of the plank securely against the upper face of the web 35 so as to rigidly connect the two truck side frames 25 together in a horizontal plane. That is, since the planks 65 are horizontally disposed and secured by the horizontally spaced rivets 66 to the side frames 25, the side frames are incapable of longitudinal movement relative to each other. However, since each plank 65 is made of a series of laminations, it is free to twist and hence permits either end of either side frame to rise without lifting the other corners of the truck. Since the spring plank 65 is stiff in a horizontal plane, it will also be appreciated that this laminated plank holds the truck side frames 25 in parallel relation in a horizontal plane, that is, it serves to prevent the truck side frames from toeing in or toeing out at either end of the truck. The laminated plank 45 can be assisted in this capacity by the provision of cross bars between the truck side frames which have universal connection with the side frames as hereinafter described.

It is also essential that the truck side frames 25 be held in parallel uniformly spaced relation to each other at all times, that is, that the truck side frames be not permitted to spread out at their tops or bottoms regardless of the load imposed upon the truck. To accomplish this each of the truck side frames 25 has secured, by rivets 68, to the opposite fore-and-aft sides of its inwardly projecting vertical flange 33 the corresponding ends of a pair of laminated cross plates 69, these laminated cross plates being each composed of a plurality of sheet metal laminations 69a arranged face to face. The pair of laminated cross plates 69 thereby serve to hold the side frames 25 in parallel uniformly spaced relation but these laminated plates 69 are capable of twisting to permit one corner of the truck to rise without lifting the other corners of the truck.

The laminated planks 65 therefore prevent the side frames 25 from moving fore-and-aft with reference to each other and the laminated cross plates 69 hold the side frames 25 from spreading and in parallel vertical planes. However, by virtue of the laminated form of the planks 65 and cross plates 69 they can both twist so as to permit one corner of the truck to be lifted without affecting the other corners of the truck.

An important feature of the invention resides in the use of a double bolster and two sets of bolster springs. The lower bolster 70 is shown as being made of cast steel and as having its ends projecting through the lower bolster openings 31 of the two side frames and as riding against the lower bolster guide columns thereof. The lower bolster is held against lateral displacement by a pair of shoulders 71 which ride along the inner or rear faces of the bolster guide columns 30. The upper end of the lower bolster 70 is supported by a set of lower bolster springs 73, each set being shown as being eight in number and composed of two parallel rows extending lengthwise of the side frame. The inner row is shown as arranged inside the bolster opening 31 and as being seated upon the lower bar 27 of the truck side frame. The outer row of each set of lower bolster springs is seated upon a horizontal shelf or flange 74 formed integral with each side frame and projecting laterally outward from the lower bar 27 thereof.

Each end of the lower bolster 70 is shown as having secured thereto a sheet metal plate 75 which is formed to provide seats for a set of upper bolster springs 78. As with the lower bolster springs 73 each set of upper bolster springs is eight in number and composed of two rows extending parallel with the side frames. The inner of these two rows of upper bolster springs 78 are arranged a short distance outside of the outer row of lower bolster springs 73 and the outer row of upper bolster springs is arranged still further outward so as to provide wide effective spring centers for the upper bolster 80 which these upper bolster springs 78 support.

This outer bolster is shown as being made of cast steel and as recessed at its ends to receive the upper bolster springs 78. The ends of the bolster project through the upper bolster opening 29 and are guided by the upper bolster guide columns 28. To prevent lateral displacement of the upper bolster it is shown as provided with outwardly projecting shoulders 81 which ride along the inner faces of the upper bolster guide columns 28. At its center the bolster is provided with the usual center plate 82 through which the body (not shown) of the passenger car is supported.

The purpose of employing the two bolsters 70 and 80 is to accommodate a total of ten inches of vertical spring deflection, and at the same time obtain the widest possible effective spring centers by locating the bolster springs at the widest possible positions. If one set of large diameter bolster springs were used and located within the specified limits required in railroad truck suspensions, the effective spring centers of the truck would be several inches closer together than is obtained in the double bolster truck forming the subject of this invention. Side sway is controlled in proportion to the square of the spring centers and it is therefore very important to place the effective spring centers out as far as possible. Of the 10 inches of total bolster spring deflection provided, approximately 7 inches is used for the static support of the body and load of a passenger car and the remaining 3 inches of deflection is available for the cushioning of the car body. With this deflection and with the arrangement of two sets of bolster springs as shown, a car frequency of 70 cycles or less per minute can be obtained, such a frequency being highly desirable for comfort and economy. Higher frequencies are more uncomfortable, while lower frequencies tend to cause the passengers to become seasick.

By placing the bottom sets of bolster springs 73 as far out as possible, an effective spring center of approximately 80 inches can be provided and by placing the upper set of bolster springs 78 out as far as possible, an effective spring center of approximately 99 inches can be obtained. The effective spring centers of the upper and lower bolster springs, acting in conjunction, can be calculated by adding the two effective spring centers together and dividing the sum by two. Thus, with the above dimensions:

80 inches+99 inches=179 inches
179 inches÷2=89½ inches, the effective spring center spacing of the suspension as a whole.

With the above spring centers and with the upper bolster 80 having a lateral pivoting movement about a point approximately 37½ inches high, a very desirable and practical side sway control is produced without the use of any auxiliary stabilizers. The side sway can be reduced to approximately zero with this type of a railroad truck when used under the present day standard passenger cars.

As previously stated, the laminated planks 65 can be assisted in their action of holding the truck side frames 25 against toeing in or toeing out at either end of the truck frame by cross rods between the truck side frames 25 which act as compression bars 85 and are universally connected to the truck side frames so as not to interfere with the flexibility of the truck in securing wheel compensation. These cross rods 85 also serve to support the brake shoes and hence these cross rods are arranged in two pairs, the rods of each pair being arranged parallel with and on opposite sides of the corresponding axle 22 in position to support the hangers for the brakes as hereinafter described.

To provide a universal mounting between each of these compression bars 85 and each truck side frame 25, each truck side frame is provided at each point of connection with the cross rod 85 with an inwardly projecting boss 88, as best shown in Fig. 7. An axial horizontal bore 89 extends through this boss and the inner end of the boss is formed with a convex spherical face 90. The end of the cross rod 85 extends into the bore 89 and is secured therein by a bushing 91 of rubber or other soft, resilient, yielding material which provides a universal connection between the truck side frame 25 and the rod. The rod is further provided with a ring 92 which can be welded thereto and which has a concave cylindrical face 93 engaging the convex cylindrical face 90 of the boss 88. Since each of the cross rods 85 connects the two truck side frames 25 with a universal joint, as illustrated in Fig. 7, it will be seen that these cross rods hold the side frames, particularly the ends thereof, in fixed spaced relation, this being obtained through the spherical contacting faces 90 and 93 of the bosses 88 and rings 92, respectively. These cross rods 85 thereby assist the laminated planks 65 in holding the truck side frames 25 against toeing in or toeing out at either end of the truck and at the same time, by the provision of the rubber bushings 91, these rods do not prevent either end of either truck side frame 25 from rising without lifting the other corners of the truck in securing wheel compensation.

Each brake shoe hanger 95 comprises a bearing collar 96 journaled on the corresponding end of the adjacent cross rod 85 and having a pair of depending ears 97 carrying a horizontal pin 98 to which is pivotally secured a depending link 99. The pin 98 is at right angles to the axis of the cross rod 85 and it will therefore be seen that the collar 96 provides a universal joint between the link 99 and the cross rod 85. The lower end of the link 99 is pivotally connected, by a pivot 100, to the end of a vertical bar 101 fast to a cross rod 102. This rod connects the bars 101 of the companion brake shoe hangers on opposite sides of the truck so that each pair of brake shoes on opposite sides of the truck is compelled to move laterally in unison. Each brake shoe 103 is pivotally mounted on the corresponding end of its cross rod 102 and can be limited in its movement in any suitable manner, the brake shoes at opposite ends of each rod 102 being spaced to engage the rim or tire of the railroad wheel 20 in the usual and well known manner.

In order to maintain the brake shoes 103 in register with the rims of the wheels so that when the brake shoes on opposite sides of the wheels are brought together by any suitable mechanism (not shown) they are brought into engagement with the same, the lower end of each of the bars 101 is provided with a laterally extending lug 105, as best shown in Fig. 6. The end of each of these lugs is engaged by the corresponding end of the inner leaf 106 of a flat leaf spring 107. Each of the leaf springs 107 is secured at its center, as shown in Figs. 2 and 5, as by rivets 108 to a depending bracket 109 formed integrally with the corresponding journal box 23.

In its broadest aspect the truck operates in the same manner as a conventional rigid bolster truck, that is, the load of the car body on the center plate 82 is transmitted through the bolsters and bolster springs to the truck side frames 25 of the truck. From the truck side frames the load is transmitted through the journal boxes 23 to the axles 22 and wheels 20. Vertical impacts are absorbed by the bolster springs, the bolsters being free to move vertically in the bolster openings for this purpose.

In accordance with the invention, however, the axles are each permitted to move laterally of the truck frame by virtue of the shackle or ring spring assemblies 60 which connect the journal boxes 23 with the pedestal legs 43. As previously pointed out, and as shown in Fig. 6, in the normal loaded position of the car the line of pressure between each axle or journal box pivot 24 and the pedestal pivot 58, that is, the line or plane intersecting the axes of these pivots, inclines upwardly and inwardly from each pedestal pivot 58 to the axle or journal box pivot 24.

The wide effective spring centers produced by the double bolster construction shown is particularly important in controlling side sway. Side sway, tipping or body roll is controlled in proportion to the square of the effective spring centers, and it is therefore important, to produce proper anti-body roll or side sway condition without auxiliary anti-roll devices, to provide the widest effective spring centers possible. Side sway is also controlled directly in proportion to the height of the lateral pivoting position of the sprung mass made up of the car body, load and trucks against the unsprung portion of the trucks. With the passenger car suspension forming the subject of this application, it is possible to place the upper bolster as high as 36 or 37 inches above the top of the track rails and still accommodate a conventional car body and use conventional wheels, axles, bearings and brakes.

The lateral cushioning of the axles by the ring springs 60 is directly related to the wide effective spring centers produced by the double bolster construction in controlling side sway. The ring springs 60 are placed low and are in a position that would be detrimental to side sway control if they had a long range of flexibility. However, while these ring springs are very sensitive and free from friction, they allow only a fraction of an inch of total deflection. Any side thrust of the car body causes the truck side frames 25 and their pivots 58 to move outwardly on the side toward which the car is trying to lean and moves the pivots 58 on the opposite side of the car body inwardly. As a result of the slanting relation between these pivots and the axle or journal body pivots 24, any side movement of the truck frame in relation to the wheel axle assemblies, in rounding a curve, causes the outside pedestal pivots to swing outward and upward in relation to the axle or journal box pivots 24 and the ground. At the same time the pivots 58 on the inside of the curve swing inward and downward, the result being to cause the car to bank on a curve similar to a bicycle or motorcycle. Thus, the wide effective spring centers produced by the double bolster construction, in combination with the use of the ring springs 60 as shown, provides a very effective side sway control without the use of auxiliary stabilizers. The side sway can be reduced to approximately zero with the truck forming the subject of this invention when used under standard passenger car bodies.

It is to be noted that the lower bolster 70 is placed in a more or less conventional position but has very little work to do. It simply acts as a guide to keep the bolster springs from tipping over and to carry the load from the upper set of bolster springs to the bottom set of bolster springs.

It will also be noted that the upper bolster 80 is unique in its positioning in that it is placed above the truck side frames but guided in a similar manner as conventional bolsters. The loads received by this upper bolster 80 in the center are carried to the far ends thereof and are delivered to the top set of bolster springs 78 and through them to the lower bolster 70 and through it to the bottom set of bolster springs 73 to the truck side frame members 25.

It will be noted that in the present suspension, the means whereby resilience is effected does not involve any frictional resistance such as occurs in the case of a conventional leaf spring and hence is free and non-energy absorbing in its action. Further, the spring suspension is free from the necessity of lubrication and hence the frictional resistance does not vary because of change of frictional resistance, through the character of the lubrication, as in the case of a conventional leaf spring. It will also be noted that weather conditions, dirt, wear and rusting will have a minimum effect upon the proper operation of this suspension.

From the foregoing it will be seen that the present invention provides lateral cushioning between the axles and the truck frame in a simple and direct manner and also provides yielding resilience between the journal boxes and the pedestal legs so as to reduce the unsprung weight of the suspension to a minimum and also so as to permit of the use of a flexible truck through the flexibility of which axle compensation is obtained. The suspension embodying the invention is particularly desirable at high speeds in securing the proper ride characteristics and at the same time obtaining the necessary stability for high speed travel. It will further be seen that the present invention provides a suspension which is light in weight and which will function to provide these improved ride characteristics with little attention or danger of breakdown.

I claim as my invention:

1. In a railroad truck, a wheeled axle, a truck frame supported on said wheeled axle and including truck side frames, each of said truck side frames being provided with a lower bolster opening and an upper bolster opening which is open at its top and arranged directly above said lower bolster opening, an upper bolster guided at its opposite ends for vertical movement in said upper bolster openings of both truck side frames and adapted to support the car body, a lower bolster guided at its opposite ends for vertical movement in said lower bolster openings of both truck side frames, upper bolster springs interposed between the opposite extremities of said upper and lower bolsters, and lower bolster springs interposed between the opposite extremities of said lower bolster and said truck side frames, said upper bolster springs being arranged further from the center of the truck frame than said lower bolster springs.

2. In a railroad truck, a wheeled axle, a truck frame supported on said wheeled axle and including truck side frames, an upper bolster guided for vertical movement in said truck side frames and adapted to support the car body, a lower bolster guided for vertical movement in said truck side frames and arranged below and generally parallel to said upper bolster, said upper and lower bolsters projecting beyond the truck side frames at each side of said truck, a group of upper bolster helical compression springs interposed between the opposite extremities of said upper and lower bolsters, and a group of lower bolster helical compression springs interposed between the opposite extremities of said lower bolster and each of said truck side frames, said upper bolster springs being arranged exteriorly of said truck side frames and said lower bolster springs being arranged closer to the center of the truck.

3. In a railroad truck, a wheeled axle, a truck frame supported on said wheeled axle and including truck side frames, each of said truck side frames being provided with a lower bolster opening and an upper bolster opening which is open at its top and arranged directly above said lower bolster opening, an upper bolster guided at its opposite ends for vertical movement in said upper bolster openings of both truck side frames and adapted to support the car body, a lower bolster guided at its opposite ends for vertical movement in said lower bolster openings of both truck side frames, upper bolster springs interposed between the opposite extremities of said upper and lower bolsters, and lower bolster springs interposed between the opposite extremities of said lower bolster and said truck side frames.

ALBERT F. HICKMAN.